US008513850B2

United States Patent
Evans et al.

(10) Patent No.: US 8,513,850 B2
(45) Date of Patent: Aug. 20, 2013

(54) ELECTRIC MACHINE AND ROTOR ARRANGEMENT

(75) Inventors: Susanne Evans, Buehl (DE); Steven Andrew Evans, Beuhl (DE)

(73) Assignee: Robert Bosch GmbH, Stuttgart (DE)

(*) Notice: Subject to any disclaimer, the term of this patent is extended or adjusted under 35 U.S.C. 154(b) by 447 days.

(21) Appl. No.: 12/675,548

(22) PCT Filed: Aug. 20, 2008

(86) PCT No.: PCT/EP2008/060900
§ 371 (c)(1),
(2), (4) Date: Oct. 15, 2010

(87) PCT Pub. No.: WO2009/027290
PCT Pub. Date: Mar. 5, 2009

(65) Prior Publication Data
US 2011/0043070 A1   Feb. 24, 2011

(30) Foreign Application Priority Data
Aug. 30, 2007 (DE) .......................... 10 2007 041 099

(51) Int. Cl.
*H02K 21/12* (2006.01)
(52) U.S. Cl.
USPC ............ 310/156.53; 310/156.01; 310/156.55; 310/156.56
(58) Field of Classification Search
USPC ............. 310/156.01, 156.33, 156.38, 156.39, 310/156.44, 156.45, 156.55, 156.56, 156.81, 310/156.83, 156.84
See application file for complete search history.

(56) References Cited

U.S. PATENT DOCUMENTS

| 2004/0256940 A1* | 12/2004 | Tsuruta et al. ........... 310/156.53 |
| 2005/0062354 A1 | 3/2005 | Iles-Klumpner |
| 2008/0218022 A1* | 9/2008 | Lee et al. ................ 310/156.53 |
| 2009/0066181 A1 | 3/2009 | Abel et al. |

FOREIGN PATENT DOCUMENTS

| DE | 103 57 502 | 7/2005 |
| EP | 1 139 548 | 10/2001 |
| JP | 2000-197292 | 7/2000 |
| JP | 2000278896 A * | 10/2000 |
| JP | 2003284275 A * | 10/2003 |

OTHER PUBLICATIONS

Machine Trnaslation JP2003284275 (2003) and JP2000278896 (2000).*
International Search Report from International Application No. PCT/EP2008/060900.

* cited by examiner

*Primary Examiner* — Tran Nguyen
*Assistant Examiner* — Jose Gonzalez Quinones
(74) *Attorney, Agent, or Firm* — Merchant & Gould P.C.

(57) ABSTRACT

The invention relates to an electric machine excited by a permanent magnet. The electric machine comprises a rotor arrangement having buried permanent magnets and a stator arrangement having an inner recess for rotationally movably receiving the rotor arrangement, the rotor arrangement comprising a plurality of rotor segments, each having a pole shoe, the outer contour thereof corresponding to an arc contour having a contour radius, the contour radius being smaller than the radius of the rotor arrangement, thus forming a gap between two adjacent rotor segments, the at least one outer contour of one of the rotor segments having an arc contour, wherein the dimensions of the contour are optimized with regard to the distortion factor of the course of the flux density distribution of the pole shoe.

9 Claims, 6 Drawing Sheets

(a) q/d = 1,5    (b) q/d = 2,0    (c) q/d = 2,5

(d) q/d = 3,0    (e) q/d = 3,5

| Ø- Rotor (mm) | Number of Poles | Magnet Height (mm) | Optimum q/d | Optimum p/m | Distortion Factor (%) |
|---|---|---|---|---|---|
| 30 | 4 | 2,0 | 2,6 | 0,77 | 2,4 |
| 40 | 4 | 2,5 | 2,8 | 0,81 | 3,1 |
| 40 | 6 | 2,5 | 2,8 | 0,78 | 2,6 |
| 50 | 4 | 3,0 | 2,8 | 0,80 | 3,6 |
| 50 | 6 | 3,0 | 2,8 | 0,78 | 3,3 |
| 50 | 8 | 3,0 | 2,8 | 0,78 | 2,7 |
| | | | Mean: | 0,79 | |

ELECTRIC MACHINE AND ROTOR ARRANGEMENT

This application is a National Stage Application of PCT/EP2008/060900, filed 20 Aug. 2008, which claims benefit of Serial No. 10 2007 041 099.0, filed 30 Aug. 2007 in Germany and which applications are incorporated herein by reference. To the extent appropriate, a claim of priority is made to each of the above disclosed applications.

TECHNICAL FIELD

The invention relates to a rotor arrangement for an electric machine, particularly for a brushless synchronous machine excited by a permanent magnet and having buried permanent magnets, and particularly to a rotor arrangement, wherein the detent torque and the torque ripple are reduced.

BACKGROUND

In order to reduce the detent torque and the torque ripple of an electric drive of, for example, a brushless synchronous motor excited by a permanent magnet, in which the rotor has permanent magnets, the rotor pole shoes of the rotor are provided with a specific shape. The shaping of the rotor pole shoes occurs in such a way that an air gap flux density distribution results, which is as sinusoidal as possible.

Up to now the outer edge of the pole shoe has for that reason been provided with a contour, by which an air gap is formed between two adjacent rotor pole shoes and which starting from the center of the rotor shoe pole extends substantially according to an inverse cosine function. A contour of a rotor pole shoe, which is formed in this manner, is referred to as a so-called Richter contour (Richter, R., "Elektrische Maschinen" ('Electric Machines'), Vol. I, "Allgemeine Berechnungselemente, Die Gleischstrommaschine" ('Common Computing Elements, The Direct Current Machine'), 3. edition, Birkhäuser Publishing House, Basel 1967, pages 168-170).

The Richter contour produces an air gap flux density distribution having a distortion factor of typically less than 2% and therefore an ideal sinusoidal air gap flux density distribution. The manufacture of a rotor with a Richter contour is complex in design and manufacture, and therefore an arc contour is used for the outer contour of the rotor pole shoes to simplify the process. The arc contour is defined by an outer radius of a circle-segment, which has a smaller radius than the rotor outside diameter and whose center is offset with respect to the shaft of the rotor along the centerline of the relevant rotor pole shoe. Such a so-called off center arc contour is a simple approximation of the Richter contour and approximately produces an air gap flux density distribution having a distortion factor of approximately 5%. This does in fact lead to a somewhat higher detent torque and a higher torque ripple than is the case for a rotor having a Richter contour. The design and the manufacture of such a rotor arrangement are however substantially simplified.

The arc radius, which is optimal for an air gap flux density distribution that is as sinusoidal as possible, is however not known when using the off center arc contour and its offset from the shaft center.

It is therefore the aim of the present invention to provide an electric machine as well as a rotor arrangement for an electric machine, whose rotor pole shoes have an off center arc contour, the rotor arrangement being optimized with regard to an air gap flux density distribution, which is as sinusoidal as possible.

SUMMARY

The invention relates to an electric machine, particularly for a synchronous machine excited by a permanent magnet. The electric machine comprises a rotor arrangement having buried permanent magnets and a stator arrangement having an inner recess for rotationally movably receiving the rotor arrangement. The rotor arrangement comprises a plurality of rotor segments, each having a pole shoe, the outer contour thereof corresponding to an arc contour having a contour radius, the contour radius being smaller than the radius of the rotor arrangement, thus forming a gap between two adjacent rotor segments. The at least one outer contour of one of the rotor segments has an arc contour designed such that an air gap length ratio of the radial spacing between the inner recess and the outer contour along a radial outer boundary of the corresponding rotor segment and the radial spacing between the inner recess and the outer contour along a radial center axis of the corresponding rotor segment is optimized with regard to the distortion factor of the course of the flux density distribution of the pole shoe. In so doing, particularly the air gap length ratio is selected such that the distortion factor is minimized. Preferably the air gap length ratio can lie between 2.6 and 2.9.

In the case of an electric machine of this kind, an arc contour is provided as an outer contour of the pole shoes, which is significantly simpler to implement than a more optimal Richter contour. By optimizing one parameter of the arc contour, it is possible to approximate the flux density course of the pole shoes to the ideal sinusoidal course.

A flux barrier region can furthermore be provided to the side of the permanent magnets between the permanent magnet and the lateral boundary of the rotor segment in order to suppress a short circuit of the magnetic flux by the rotor segment associated with the permanent magnet.

According to one embodiment, additional flux barrier regions, which are disposed on the sides of the permanent magnet facing the lateral boundaries of the rotor segment, can be provided between the permanent magnet and the outer contour of the associated pole shoe. In so doing, the effective width of the permanent magnet is reduced in the tangential direction of the rotor arrangement.

The ratio between the width of the permanent magnet reduced by the additional flux barrier regions and that of the overall width of the permanent magnet can furthermore be optimized with regard to the distortion factor of the course of the flux density distribution of the pole shoe. The ratio between the width of the permanent magnet reduced by the additional flux barrier regions and that of the overall width of the permanent magnet can particularly lie in a range between 0.77 and 0.81, particularly at 0.79.

The rotor arrangement can have a consequent-pole arrangement, wherein only every other rotor segment is provided with a permanent magnet, wherein the permanent magnets have a like polarity with respect to the radial direction, wherein consequent-pole flux barrier regions, which define a consequent-pole angle with respect to the center of the rotor arrangement, are in each case provided at the two boundaries of a consequent-pole rotor segment disposed between the two rotor segments provided with permanent magnets, wherein the consequent-pole flux barrier regions are configured so that a ratio of the consequent-pole angle to the angle of the rotor segment is optimized with regard to the distortion factor of the course of the flux density distribution of the pole shoe. Particularly the ratio of the consequent-pole angle to the angle of the rotor segment can lie in the range of 0.73 to 0.76, particularly at 0.75.

According to another aspect, a rotor arrangement is provided, particularly for a synchronous machine excited by a permanent magnet. The rotor arrangement comprises a plurality of rotor segments, each having a pole shoe, the outer contour thereof corresponding to an arc contour having a contour radius, the contour radius being smaller than the radius of the rotor arrangement, thus forming a gap between two adjacent rotor segments, at least one rotor segment having a buried permanent magnet. Additional flux barrier regions, which are disposed on the sides of the permanent magnet facing the lateral boundaries of the rotor segment, are furthermore provided between the permanent magnet and the outer contour of the associated pole shoe. The effective width of the permanent magnet is thereby reduced in the tangential direction, the ratio between the width of the permanent magnet reduced by the additional flux barrier regions and the overall width of the permanent magnet being optimized with regard to the distortion factor of the course of the flux density distribution, and particularly in a range between 0.77 and 0.81, in particular at 0.79.

A rotor arrangement of this kind likewise makes the optimization of the flux density course possible when using an arc contour as the outer contour of a pole shoe.

BRIEF DESCRIPTION OF THE FIGURES

Preferred embodiments of the invention are explained below using the accompanying drawings. The following are shown:

FIG. 2 is a depiction of the rotor arrangement of the electric machine from

FIG. 1;

DETAILED DESCRIPTION

Figure 1:
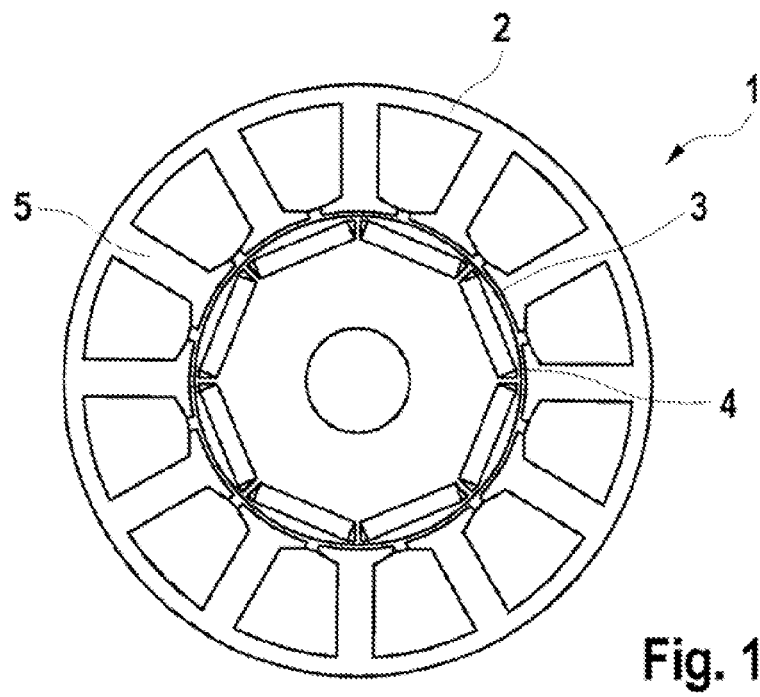
FIG. 1 is a schematic sectional representation through an electric machine according to the technical field.

The same reference numerals represent elements with the same or a comparable function in the examples of embodiment shown below.

FIG. 1 shows a cross-sectional depiction through an electric machine, particularly through a synchronous motor 1 excited by a permanent magnet having a stator arrangement 2, wherein a stator recess is situated. In the stator recess 3, a rotor arrangement 4 is rotatably disposed about a shaft. The stator arrangement 2 has stator teeth 5 pointing in the direction of the rotor arrangement 4 (inwards), which all or in part are wound by (unspecified) stator coils. The stator teeth 5 are widened towards the stator recess 3 and in each case are provided with a contour having the shape of a segment of a circle, which defines a large part of the interior surface of the stator recess 3. The stator arrangement 2 is preferably composed of metal sheets in the axial direction (axial direction of the rotor arrangement), which are preferably manufactured by stamping so that the stator arrangement 2 is made available as a laminated core.

Figure 2:
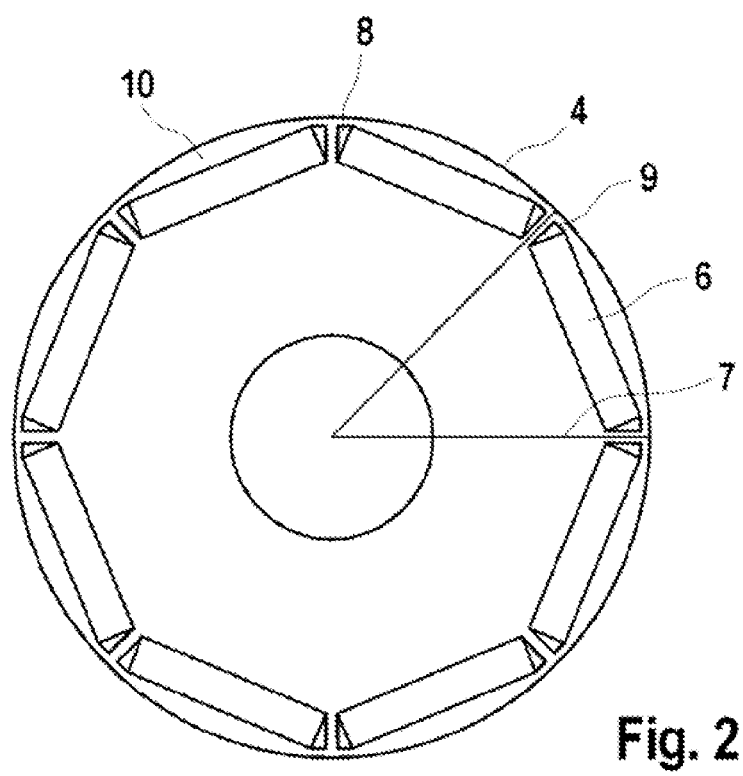

In FIG. 2, a detailed depiction of the rotor arrangement 4 is shown. The rotor arrangement 4 has permanent magnets 6, which are disposed in pockets 9 inside of said rotor arrangement 4, and are consequently "buried". The permanent magnets 6 are in each case disposed in rotor segments 7 and in each case have a pole shoe 10. The polarity of the permanent magnets 6 is in the radial direction. In order to prevent a magnetic short circuit from occurring inside of a rotor segment 7 past the permanent magnet 6, the pockets 9 are configured larger than the permanent magnets 6 to be accommodated therein. In so doing, a flux barrier region 8, which is substantially configured as a recess filled with air in the laminated core that forms the rotor arrangement 4, is provided laterally alongside the permanent magnets 6, i.e. in the tangential direction of the rotor arrangement 4, respectively in the direction towards the adjacent rotor segment. The flux barrier regions 8 of two adjacent rotor segments 7 are separated from each other by a web in the rotor arrangement 4 in order to fix the sections of the rotor arrangement 4, which are situated peripherally in the radial direction and represent the pole shoes 10, to the rotor arrangement 4.

The permanent magnets 6 are provided in the correspondingly configured pockets 9 in the rotor arrangement, said pockets having a shape that allows for the flux barrier regions 8 to remain on both sides of the permanent magnet 6 (in the tangential direction) after said permanent magnet 6 has been inserted. As shown in FIG. 2, conventional pole shoes of a rotor arrangement 4 can also be configured without specific contour so that the outer contour of the rotor arrangement is circular.

Figure 3:
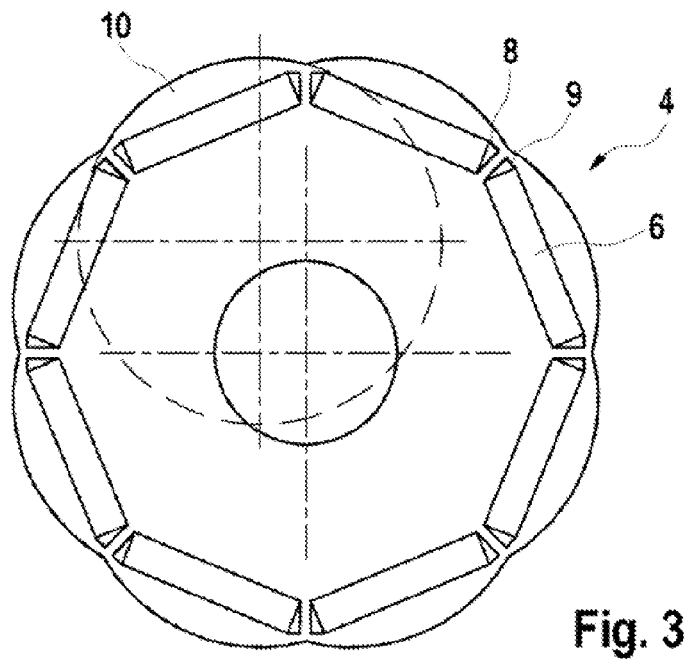
FIG. 3 is a rotor arrangement, wherein the rotor pole shoes have an arc contour according to an embodiment of the invention.

A rotor arrangement 4 is shown in FIG. 3, wherein pole shoes 10 are provided with an arc contour in order to achieve an air gap density distribution, which is as sinusoidal as possible. The arc contour is defined as a segment of a circle of an auxiliary circuit offset to the center of the shaft of the rotor arrangement 4 along a radial center line (symmetry line) of the corresponding rotor segment 7, said auxiliary circuit having a correspondingly smaller radius than the rotor arrangement.

Figure 4:
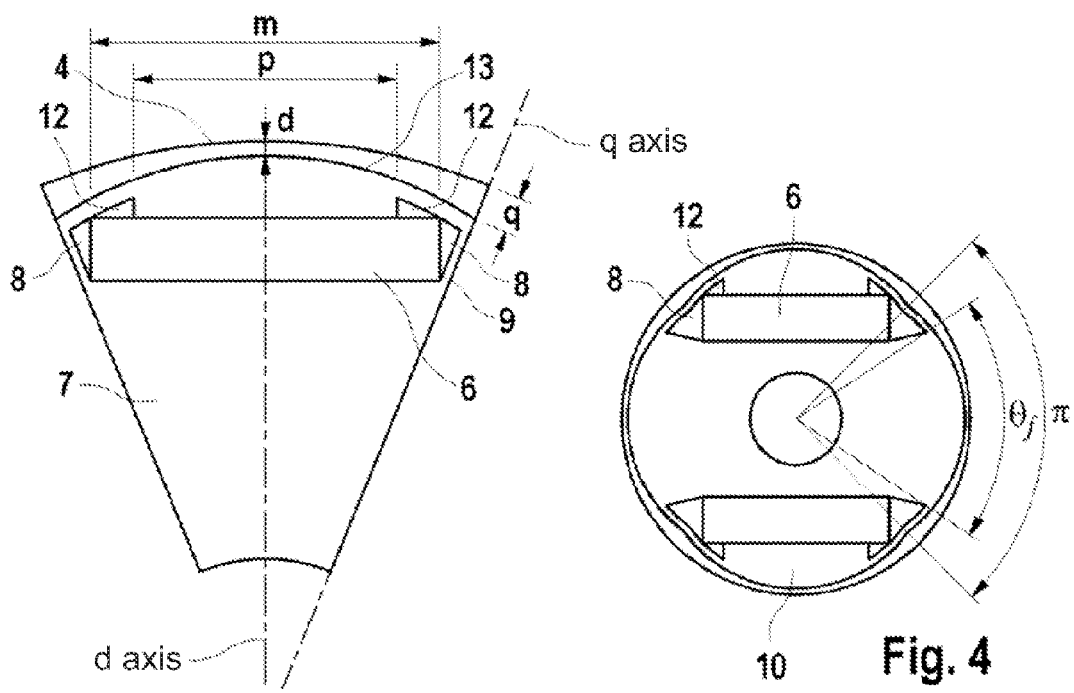
FIG. 4 is a sectional representation of a rotor segment and a rotor arrangement according to the present invention.
Figure 5:
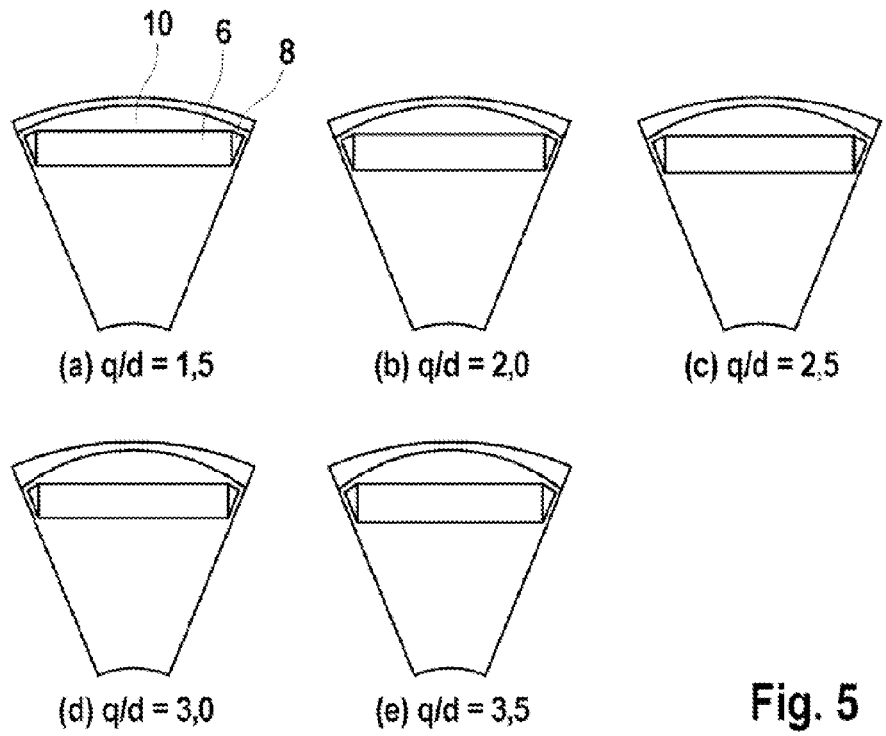
FIGS. 5a-5e are Cut-outs of a rotor arrangement, which in each case depict a rotor segment having different air gap length ratios.

A rotor segment 7 of the rotor arrangement 4 is in part depicted in FIG. 4. The rotor segment 7 comprises the pocket 9, wherein the permanent magnet 6 is embedded. The pocket 9 preferably has a shape that allows for the aforementioned flux barrier regions 8 to remain alongside the permanent magnet 6, i.e. in the substantially tangential direction, after said permanent magnet 6 has been inserted. In so doing, a magnetic short circuit through the material of the rotor segment 7 can be prevented from occurring.

The pocket 9 can furthermore be configured such that an additional flux barrier region 12 remains on top, i.e. in the radial direction outwards, on the sides of the permanent magnet 6 after said permanent magnet 6 has been inserted. The additional flux barrier region 12 extends on both sides of the edge associated with the adjacent rotor segment 7 along the length of the radially external surface of the permanent magnet 6. The outer boundary of the additional flux barrier region 12 runs substantially parallel to the outer contour of the pole shoe 10. The additional flux barrier regions 12 define the effective pole shoe width p, which is smaller than the magnet width m when provision is made for the additional flux barrier regions 12.

The outer contour 13 of the pole shoe 10 has substantially the shape of a segment of a circle and has a smaller radius than the radius of the rotor arrangement. The entire rotor segment 7 is substantially constructed mirror-symmetrical to a d-axis. Different spacings occur between the stator recess 3 and the outer contour 13 on account of the different curvature radii. With regard to the air gaps formed in this manner, The air gap spacing between the interior surface of the stator recess 3 and the outer contour on the d-axis is denoted as d and the air gap spacing between the surfaces along the q axis are denoted as q. The relation between the inner radius of the stator recess 3, the radius of the rotor arrangement 4 and the outer contour 13 of the pole shoes 10 can be defined by the air gap length ratio q/d of the air gap spacings independently of the corresponding radii.

Figure 6:
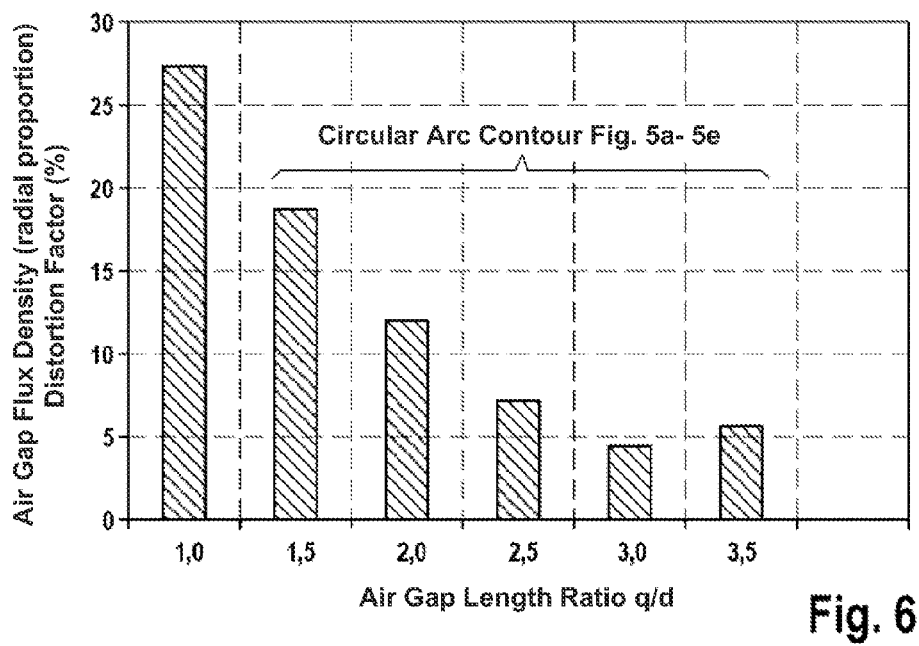
FIG. 6 is a depiction of the distortion factor of the air gap flux density as a function of the air gap length ratios, which are depicted in FIGS. 5a-5e.

In the FIGS. 5a-5e different configurations of rotor segments 7 are depicted by way of example for different air gap length ratios q/d. It can be seen in said configurations that the more pronounced the curvature of the outer contour of the pole shoe is, the greater is the spacing q with respect to the spacing d. If the air gap flux density course of such a pole shoe is now checked with an arc contour that is dependent on the air gap length ratio for the air gap length ratios 1.0, 1.5, 2.0, 2.5, 3.0, 3.5, it is apparent, as is depicted in FIG. 6 as a diagram, that the smallest distortion factor of the air gap flux densities (i.e. the best approximation of a sinusoidal air gap flux density course) is achieved at an air gap length ratio of approximately 3. More precise analyses result in the optimal air gap length ratio lying in the range of 2.6 to 2.9, preferably in the range of 2.7 to 2.8 and more preferably in the range of 2.7 to 2.75, particularly at 2.7.

Figure 7:
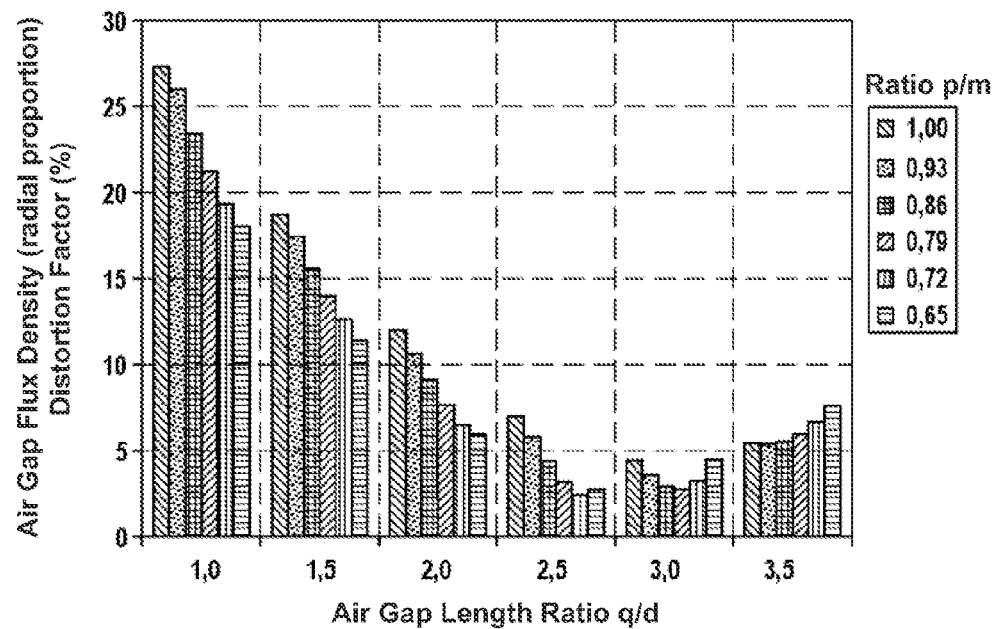
FIG. 7 is a depiction of the distortion factor of the air gap flux density as a function of the pole shoe/magnet width ratio and the air gap length ratio in a range between an air gap length ratio of 1 to 3.5 and particularly in a range of 2.6 to 2.9.
Figure 7:
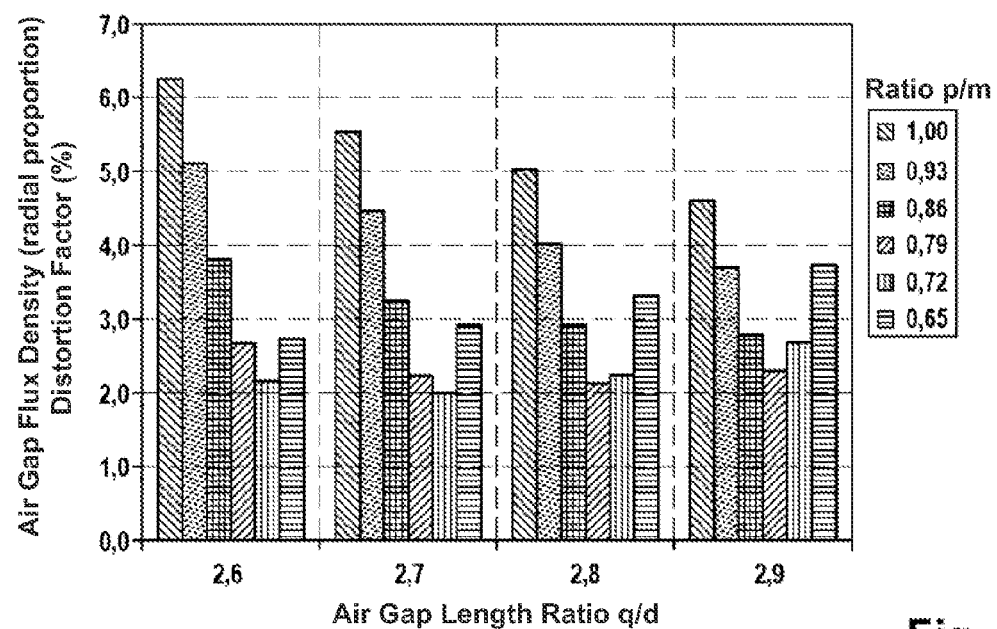

In designing the rotor arrangement 4, as it is depicted in FIGS. 3 and 4, the pole shoe/magnet width ratio p/m can furthermore be optimized. Said ratio is determined by the width of the additional flux barrier regions 12, which covers the radially outward directed side of the permanent magnet 6 at the edge regions of said side, which are associated with the adjacent rotor segments 7. As can be seen in FIG. 7, the optimal pole shoe/magnet width ratio p/m lies in a range between 0.65 and 1, preferably in a range between 0.77 and 0.81 and more preferably at 0.79 for different air gap length ratios. The width of the additional flux barrier regions 12 thereby does not or only negligibly influences the optimal value of the air gap length ratio q/d.

Figures 8, 9:
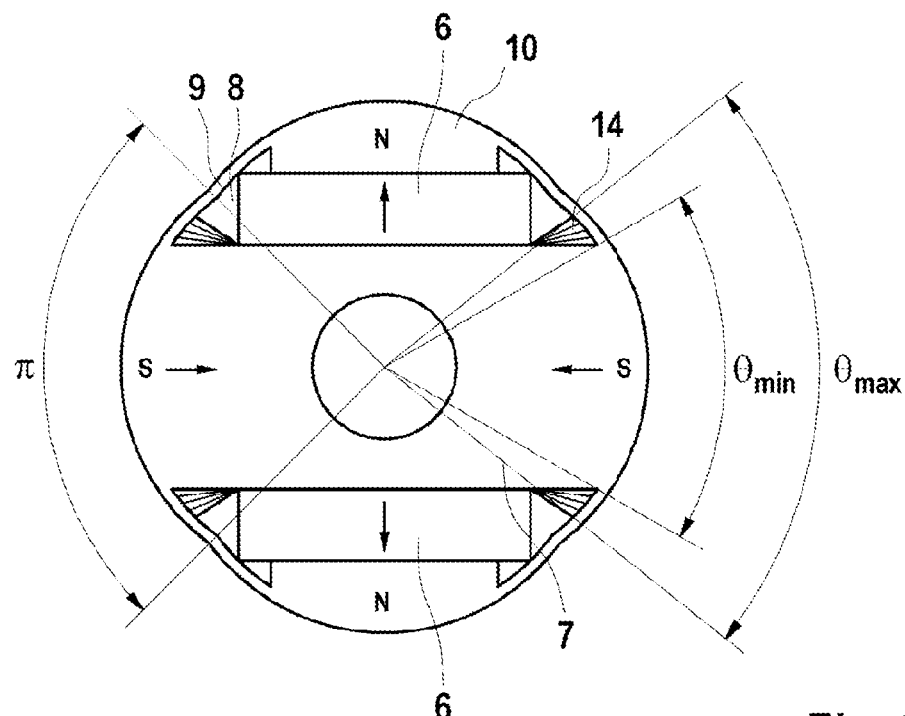
FIG. 8 is a table, which indicates the optimal air gap length ratio and the optimal pole shoe/magnet width ratio for different rotor diameters and for different numbers of poles and different magnet heights.
FIG. 9 is a rotor arrangement with a consequent-pole arrangement, which has a consequent-pole flux barrier region.

In the table of FIG. 8, the optimal air gap length ratio q/d and the optimal pole shoe/magnet width ratios p/m are depicted for different rotor diameters, different numbers of poles and different magnet heights. It is thereby apparent that the optimal air gap length ratio changes only insignificantly in the range between 2.6 and 2.8, and the same is true for the optimal pole shoe/magnet width ratio in the range of 0.77 to 0.81.

A rotor arrangement 4 according to an additional embodiment of the invention is shown by way of example in FIG. 9. The rotor arrangement 4 of FIG. 9 has four poles and only two permanent magnets 6. The permanent magnets 6 have opposite polarities to one another and are disposed opposite each other with respect to the shaft of the rotor arrangement 4 and thus form a consequent-pole arrangement. The pole shoes, which are provided with permanent magnets 6, as well as the consequent-pole pole shoes are configured according to an optimized air gap length ratio q/d=2.8. In the case of the pole shoes provided with permanent magnets 6, the pockets 9 are configured according to the optimized pole shoe/magnet width ratio p/m of 0.79 as previously described in the application. In so doing, an approximately sinusoidal course of the flux density of the pole shoes 10 provided with the permanent magnets as well as of the consequent-pole pole shoes is achieved.

The embodiment of FIG. 9 is not only limited to 4 poles, but also provision can be made for a consequent-pole arrangement with any even number of poles.

In order to further optimize the air gap flux density of the consequent pole with regard to its sinusoidal course, consequent-pole flux barrier regions 14, for example as recesses, are provided in each rotor segment 7 of one of the consequent poles laterally at the radial boundaries of the rotor segments 7 of the consequent poles. In so doing, the effective consequent-pole shoe width is reduced. The consequent-pole flux barrier regions 14 can likewise be part of the pockets 9 for the permanent magnets 6 and are particularly provided as extensions to the flux barrier regions 8 in the direction of a center line of the rotor segment 7 of the consequent pole. The shape of the consequent-pole flux barrier regions 14 can substantially be arbitrary. Said consequent-pole flux barrier regions 14 however preferably have an edge bounded in the radial direction, which follows the course of the outer contour of the rotor arrangement 4.

Starting from the angle of the rotor segment, which results from dividing 360E by the total number of poles, a reduced angle compared to the angle of the rotor segment 7 results with respect to the center of the rotor arrangement 4 and the smallest width of the consequent pole, which is defined by the consequent-pole flux barrier regions 14. That is to say that the reduced angle results from the maximum angle with respect to the center of the rotor arrangement 4, which is possible by two radial lines originating at said center that are not interrupted by the consequent-pole flux barrier regions 14. This reduced angle is thus determined by the length, with which the consequent-pole flux barrier regions 14 protrude into the rotor segment 7 of the consequent pole.

Figure 10:
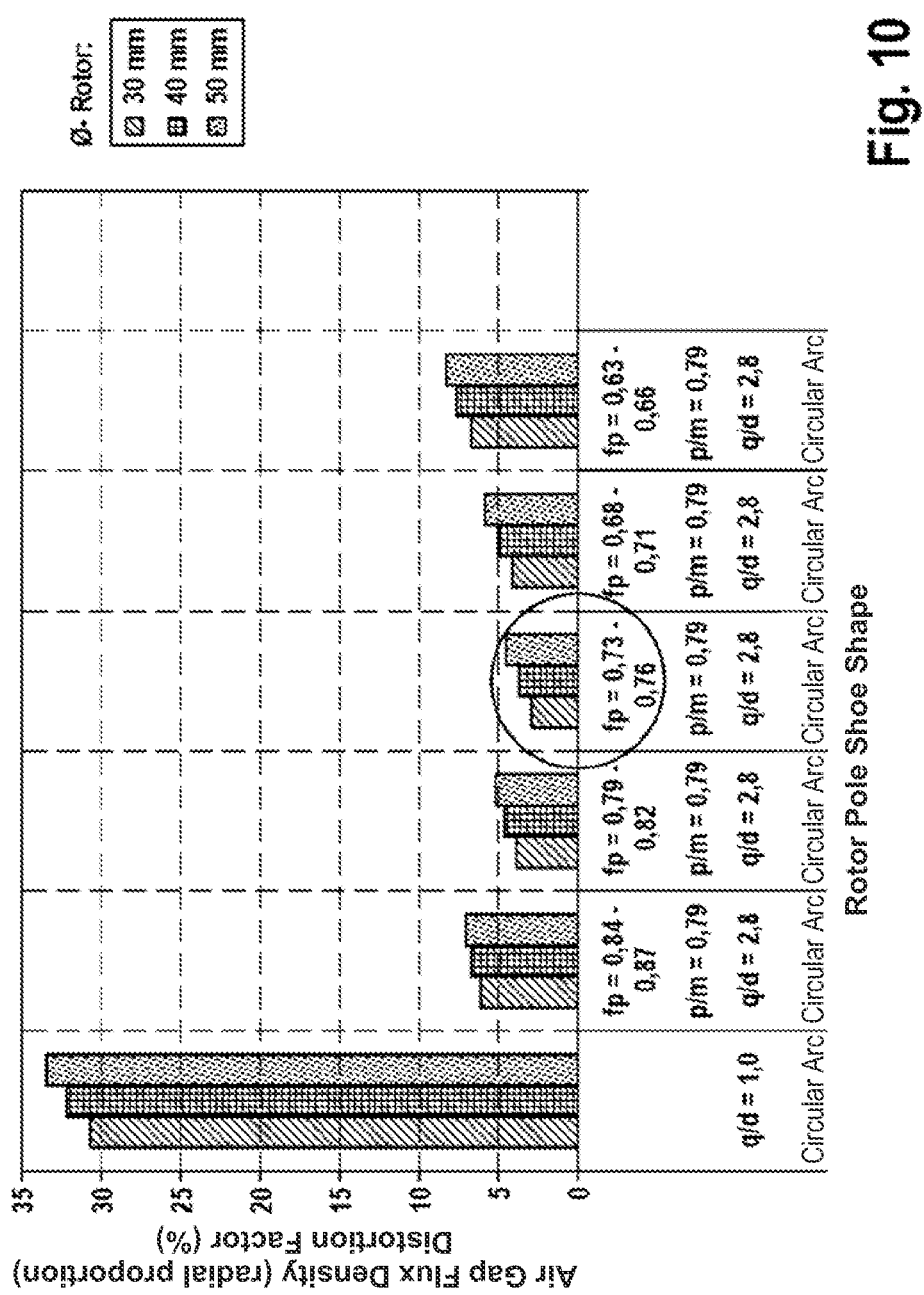
FIG. 10 is a diagram for a distortion factor of the air gap density as a function of the consequent pole/pole distribution ratio

The ratio between the reduced angle of the consequent pole and the complete angle of a rotor segment 7 is designated as the consequent-pole shoe/pole distribution ratio $2_{fp}$. An empirical analysis of the optimal consequent-pole shoe/pole distribution ratio for different rotor diameters at an optimal air gap length ratio q/d=2.8 and an optimal pole shoe/magnet width ratio p/m=0.79 is shown in FIG. 10. An optimal consequent-pole shoe/pole distribution ratio results from FIG. 10 in the range between 0.63 to 0.87, preferably in the range between 0.73 to 0.76 and particularly more preferably for 0.73.

The invention claimed is:

1. Electric machine, particularly for a synchronous machine excited by a permanent magnet, comprising:
   a rotor arrangement having buried permanent magnets;
   a stator arrangement having an inner recess for rotationally movably receiving the rotor arrangement;
   the rotor arrangement comprising a plurality of rotor segments, each having a pole shoe, the outer contour thereof corresponding to an arc contour having a contour radius, the contour radius being smaller than the radius of the rotor arrangement, thus forming a gap between two adjacent rotor segments wherein the at least one outer contour of one of the rotor segments has an arc contour designed such that an air gap length ratio of the radial spacing between the inner recess and the outer contour along a radial outer boundary of the corresponding rotor segment and the radial spacing between the inner recess and the outer contour along a radial center axis of the corresponding rotor segment is optimized with regard to the distortion factor of the course of the flux density distribution of the pole shoe;

wherein the rotor arrangement has a consequent-pole arrangement, wherein only every other rotor segment is provided with permanent magnets, wherein the permanent magnets have a like polarity with respect to the radial direction, wherein consequent-pole flux barrier regions, which define a consequent-pole angle with respect to the center of the rotor arrangement, are provided in each case at the two boundaries of a consequent-pole rotor segment disposed between two rotor segments provided with permanent magnets, wherein the consequent-pole flux barrier regions are configured such that a ratio of the consequent-pole angle to the angle of the rotor segment is optimized with regard to the distortion factor of the course of the flux density distribution of the pole shoe.

2. Electric machine according to claim 1, wherein the air gap length ratio lies between 2.6 and 2.9.

3. Electric machine according to claim 1, wherein laterally to the permanent magnets a flux barrier region is provided between the permanent magnet and the lateral boundary of the rotor segment in order to suppress a short circuit of the magnetic flux by the rotor segment associated with the permanent magnet.

4. Electric machine according to claim 1, wherein additional flux barrier regions are provided between the permanent magnet and the outer contour of the associated pole shoe, which are disposed at the sides of the permanent magnet facing the lateral boundaries of the rotor segment, in order to reduce the effective width of the permanent magnet in the tangential direction of the rotor arrangement.

5. Electric machine according to claim 4, wherein the ratio between the width of the permanent magnet reduced by the additional flux barrier regions and the overall width of the permanent magnet is optimized with regard to the distortion factor of the course of the flux density distribution of the pole shoe.

6. Electric machine according to claim 4, wherein the ratio between the width of the permanent magnet reduced by the additional flux barrier regions and that of the overall width of the permanent magnet lies in a range between 0.77 and 0.81, particularly at 0.79.

7. Electric machine according to claim 1, wherein the ratio of the consequent-pole angle to the angle of the rotor segment lies in the range of 0.73 to 0.76, particularly at 0.75.

8. Rotor arrangement, particularly for a synchronous machine excited by a permanent magnet, comprising:
   a plurality of rotor segments, each having a pole shoe, the outer contour thereof corresponding to an arc contour having a contour radius, the contour radius being smaller than the radius of the rotor arrangement, thus forming a gap between two adjacent rotor segments, at least one rotor segment having a buried permanent magnet;
   wherein additional flux barrier regions are provided between the permanent magnet and the outer contour of the associated pole shoe, which are disposed at the sides of the permanent magnet facing the lateral boundaries of the rotor segment, in order to reduce the effective width of the permanent magnet in the tangential direction of the rotor arrangement, the ratio between the width of the permanent magnet reduced by the additional flux barrier regions and the overall width of the permanent magnet being optimized with regard to the distortion factor of the course of the flux density distribution of the pole shoe and particularly in a range between 0.73 and 0.76, in particular at 0.75; and
   wherein the rotor arrangement has a consequent-pole arrangement, wherein only every other rotor segment is provided with permanent magnets, wherein the permanent magnets have a like polarity with respect to the radial direction, wherein consequent-pole flux barrier regions, which define a consequent-pole angle with respect to the center of the rotor arrangement, are provided in each case at the two boundaries of a consequent-pole rotor segment disposed between two rotor segments provided with permanent magnets, wherein the consequent-pole flux barrier regions are configured such that a ratio of the consequent-pole angle to the angle of the rotor segment is optimized with regard to the distortion factor of the course of the flux density distribution of the pole shoe.

9. Electric machine with a rotor arrangement according to claim 8.

* * * * *